United States Patent

Evans

[15] 3,673,903
[45] July 4, 1972

[54] BAND SAW BLADE CLEANING MEANS
[72] Inventor: David T. Evans, Three Rivers, Mich.
[73] Assignee: Wells Manufacturing Corporation, Three Rivers, Mich.
[22] Filed: June 1, 1970
[21] Appl. No.: 42,156

[52] U.S. Cl. .................................................83/168, 83/201.15
[51] Int. Cl. ...........................................................B23d 59/00
[58] Field of Search ........................83/168, 201.15; 143/158

[56] References Cited

UNITED STATES PATENTS

| | | |
|---|---|---|
| 1,272,892 | 7/1918 | Baur.................................143/158 UX |
| 1,778,053 | 10/1930 | White.....................................143/158 |
| 3,034,387 | 5/1962 | Sebastian..................................83/168 |
| 2,978,001 | 4/1961 | Whisler..................................143/158 |
| 3,485,123 | 12/1969 | Komendowski..........................83/168 |

Primary Examiner—James M. Meister
Attorney—Talivaldis Cepuritis and Gordon W. Hueschen

[57] ABSTRACT

A rotary brush means adapted to sweep the cutting edge of a band saw blade and driven by a blade guide roller.

3 Claims, 3 Drawing Figures

PATENTED JUL 4 1972
3,673,903
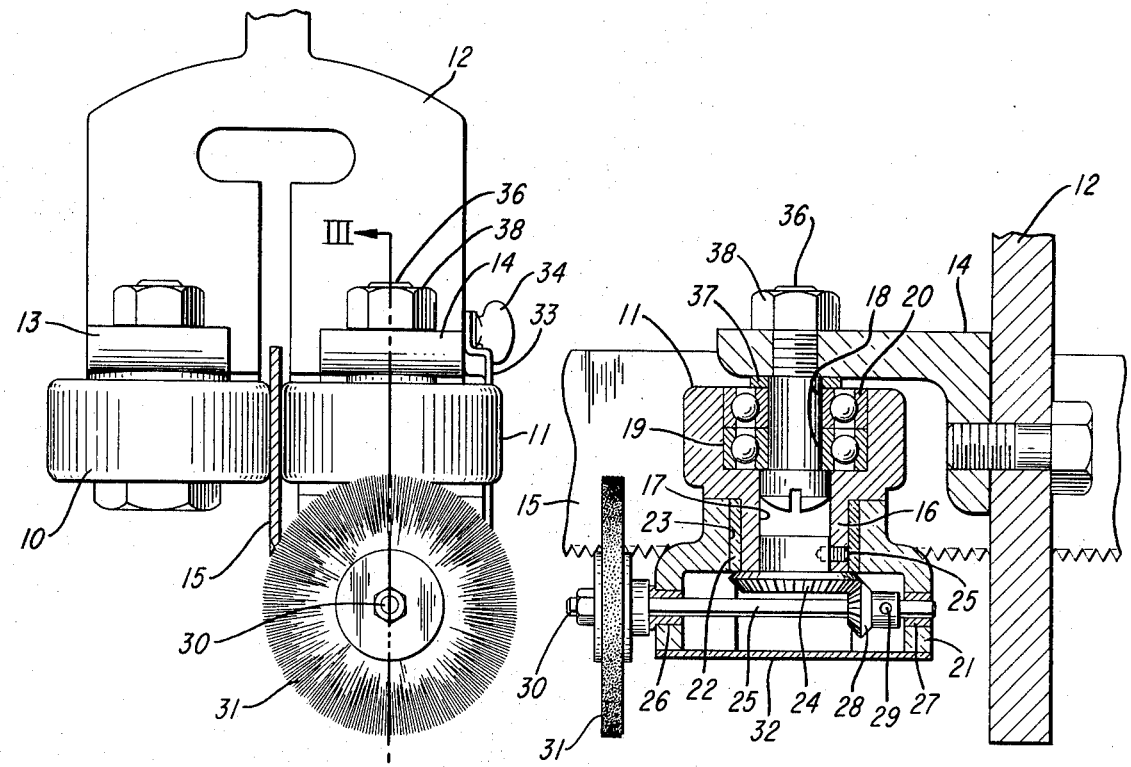
figure 1
figure 3
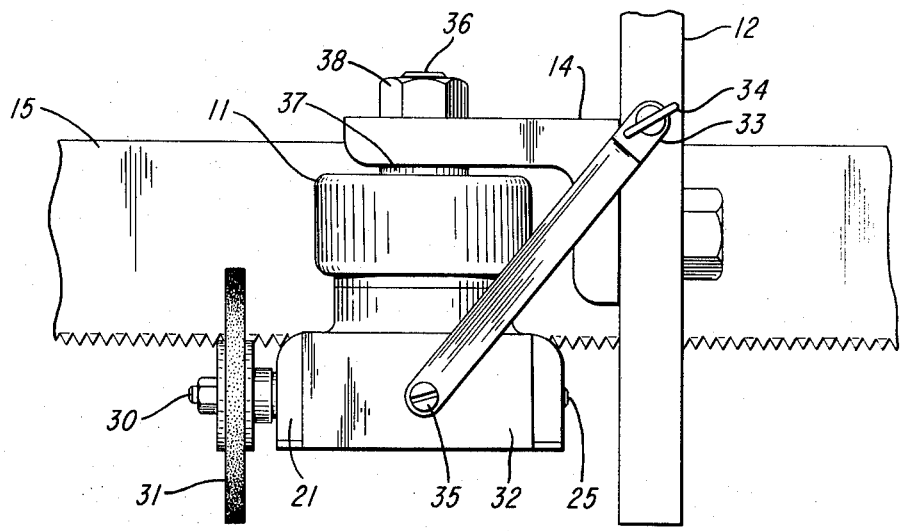
figure 2
INVENTOR.
DAVID T. EVANS
BY
ATTORNEY

BAND SAW BLADE CLEANING MEANS

BACKGROUND OF THE INVENTION

In high speed cutting of hard materials, such as metals or the like, with a band saw, chips generated during cutting sometimes lodge between the teeth of the saw blade and can cause stripping of the teeth. It is an object of the present invention to provide a positive blade cleaning means which obviates, or at least minimizes, the likelihood of chip retention on a band saw blade after cutting. It is another object to provide means for extending blade life. Still other objects will become apparent to one skilled in the art upon reference to the ensuing specification, drawing, and the claims.

SUMMARY OF THE INVENTION

The present invention contemplates a rotary brush means driven by the rotational motion of a band saw blade guide roller. The brush means rotates in a plane substantially normal to the plane of rotation of the guide roller and sweeps chips from the saw blade as it moves past the brush.

BRIEF DESCRIPTION OF THE DRAWING

In the drawing,

FIG. 1 is a fragmentary elevational view, partly in section, showing a band saw blade roller guide equipped with the cleaning means of this invention;

FIG. 2 is another fragmentary elevational view of the roller guide shown in FIG. 1 taken at 90° relative to the view of FIG. 1; and FIG. 3 is an elevational view, partly in section, taken along line III—III of FIG. 1 and showing interior detail of the present blade cleaning means.

DESCRIPTION OF THE PREFERRED EMBODIMENTS

Referring to FIGS. 1 and 2, blade guide rollers 10 and 11 are mounted on yoke 12 by means of angles 13 and 14, respectively. Band saw blade 15 is gripped between guide rollers 10 and 11 and guided thereby in a conventional manner.

Guide roller 11 is provided with integral hub 16 (FIG. 3) which depends downwardly therefrom. Central bore 17 of hub 16 extends axially therethrough and communicates with axial bore 18 of roller bearings 19 and 20 within guide roller 11. Gear housing 21 is rotatably mounted on hub 16 which is journaled in sleeve bearing 22 pressed within central bore 23 of housing 21.

Bevel gear 24 is mounted on hub 16 and held in place within bore 17 by setscrew 25 which is accessible from outside of housing 21 through a suitable opening (not shown) in the housing wall. Bevel gear 24 also retains housing 21 in place on hub 16.

Shaft 25 extends transversely across housing 21 and is journaled in bearings 26 and 27. Bevel gear 28 operably engages gear 24 and is fixedly mounted on shaft 25 by means of setscrew 29. End 30 of shaft 25 projects outside of housing 21 and carries rotary brush 31 such as wire brush or the like, suitably mounted thereon.

Cover plate 32 encloses the gear assembly comprising bevel gears 24 and 28 within housing 21 and is held in place in any convenient manner such as by screws, clips, or the like (not shown).

Inasmuch as housing 21 can rotate about hub 16, arm 33 (FIG. 2) pivotably affixed to yoke 12 with thumbscrew 34, or the like, is provided and holds housing 21 in position with brush 31 in sweeping contact with saw blade 15. Screw means 35 in arm 33 bears against cover plate 32 and is utilized to adjust brush 31 to a desired position against blade 15

Guide roller 11 is mounted on angle 14 by means of through bolt 36, washer 37, and nut 38. During cutting, as blade 15 moves through guide rollers 10 and 11, these rollers are rotated. Rotation of guide roller 11, in turn, rotates bevel gear 24 which drives brush 31 through shaft 25 by means of bevel gear 28.

The foregoing discussion and the drawing are intended as illustrative but not limiting. Still other variations and rearrangements of parts within the spirit and scope of this invention will readily present themselves to a skilled artisan.

I claim:

1. Band saw blade cleaning means which comprises
   a blade guide roller driven in a rotational motion directly by the band saw blade; and
   rotary brush means drivably connected to said roller, driven by the rotational motion of said roller, and rotating in a plane substantially normal to the plane of rotation of said roller.

2. Band saw blade cleaning means of claim 1 comprising
   a blade guide roller provided with an integral hub depending from said roller;
   a first bevel gear fixedly mounted in said hub;
   a gear housing rotatably mounted on said hub;
   a shaft journaled in said housing and projecting outwardly therefrom;
   a second bevel gear fixedly mounted on said shaft within the housing and operably engaging sad first bevel gear; and
   a brush means fixedly mounted on said shaft outside of said housing, driven by said shaft in response to rotation of said blade guide roller, and adapted to sweep a band saw blade guided by said roller.

3. Band saw blade cleaning means in accordance with claim 2 wherein said hub is journaled within a sleeve bearing in said gear housing.

* * * * *